(12) United States Patent      (10) Patent No.: US 8,218,649 B2
Mizutani      (45) Date of Patent: Jul. 10, 2012

(54) INFORMATION PROCESSING APPARATUS AND RECOVERY PROCESSING METHOD

(75) Inventor: Fumitoshi Mizutani, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/099,313

(22) Filed: May 2, 2011

(65) Prior Publication Data

US 2011/0206134 A1    Aug. 25, 2011

Related U.S. Application Data

(63) Continuation of application No. 12/428,339, filed on Apr. 22, 2009, now abandoned.

(30) Foreign Application Priority Data

Jun. 13, 2008    (JP) .................................. 2008-155608

(51) Int. Cl.
*H04B 1/66*      (2006.01)
(52) U.S. Cl. ................................................. 375/240.24
(58) Field of Classification Search . 375/240.01–240.24
See application file for complete search history.

(56) References Cited

U.S. PATENT DOCUMENTS

| | | | | |
|---|---|---|---|---|
| 6,480,546 B1 * | 11/2002 | Kim et al. | ................. | 375/240.27 |
| 6,614,843 B1 * | 9/2003 | Gordon et al. | ............ | 375/240.01 |
| 6,754,278 B1 * | 6/2004 | Suh et al. | .................. | 375/240.27 |
| 6,842,219 B2 * | 1/2005 | Lee | ............................... | 352/244 |
| 6,987,805 B1 * | 1/2006 | Weckel et al. | ................. | 375/240 |
| 7,027,515 B2 * | 4/2006 | Lin | ........................... | 375/240.25 |
| 7,254,824 B1 * | 8/2007 | Gordon et al. | .................. | 725/54 |
| 7,606,313 B2 * | 10/2009 | Raman et al. | ............. | 375/240.27 |
| 2005/0111743 A1 * | 5/2005 | Kong et al. | .................... | 382/236 |
| 2006/0256872 A1 * | 11/2006 | Esaki | ........................ | 375/240.27 |
| 2009/0002379 A1 * | 1/2009 | Baeza et al. | ................... | 345/522 |

FOREIGN PATENT DOCUMENTS

| | | |
|---|---|---|
| JP | 06-311052 A | 11/1994 |
| JP | 09-154135 A | 6/1997 |
| JP | 09-154142 A | 6/1997 |
| JP | 2005-318255 A | 11/2005 |
| JP | 2006-262406 A | 9/2006 |
| JP | 2006-345046 A | 12/2006 |
| JP | 2007-043575 A | 2/2007 |

OTHER PUBLICATIONS

Notice of Reasons for Rejection mailed by Japan Patent Office on Dec. 1, 2009 in the corresponding Japanese patent application No. 2008-155608.

* cited by examiner

*Primary Examiner* — Tung Vo
(74) *Attorney, Agent, or Firm* — Knobbe Martens Olson & Bear, LLP

(57) ABSTRACT

According to one embodiment, an information processing apparatus includes a recovery module which causes a decoding module to decode supplementary slice data when it is determined that the value of the information indicating a position of processing target slice data in the image is inappropriate. The recovery module creates the supplementary slice data by editing slice data located upwardly adjacent to the processing target slice in such a manner that information indicating a position thereof in the image is edited into information for the processing target slice.

7 Claims, 9 Drawing Sheets

INFORMATION PROCESSING APPARATUS AND RECOVERY PROCESSING METHOD

CROSS-REFERENCE TO RELATED APPLICATIONS

This is a continuation of U.S. patent application Ser. No. 12/428,339 filed on Apr. 22, 2009, which is based upon and claims the benefit of priority from Japanese Patent Application No. 2008-155608, filed Jun. 13, 2008, the entire contents of both, which are incorporated herein by reference.

BACKGROUND OF THE INVENTION

1. Field of the Invention

One embodiment of the invention relates to a decode control technology for performing a suitable decode on a video stream, which is applied to, for example, a personal computer including a TV function capable of recording and reproducing digital broadcast program data which is broadcast with a television broadcast signal.

2. Description of the Related Art

Recently, battery-drivable and easy-to-carry notebook type personal computers are in wide use. These types of computers have been subjected to reduction in thickness and weight, while simultaneously making improvements in functionality. As a result, such computers incorporating a TV function for showing digital television broadcast programs have appeared. Therefore, if a user carries such type of computer while traveling or away from home, a digital television broadcast program can be enjoyed.

Furthermore, with the improvement in the wireless communication environment, it has become easy to be connected to the Internet while a user is outside or traveling. It has become thus possible to receive digital television broadcast program data from a server connected via the Internet and watch the received program outside the home or office.

Digital broadcast program data is a video stream that is compression-encoded with, for example, a method compliant with an MPEG (Moving Picture Experts Group) 2 standard. During a transfer of such a compression-encoded video stream, a part thereof may be lost or an error may occur therein. In order to reproduce such a video stream in which an error occurs or a part thereof is missing, various recovery mechanisms have been proposed so far (e.g., Jpn. Pat. Appln. KOKAI publication No. 9-154135).

Generally, a computer is equipped with a graphics accelerator (hereinafter referred to as accelerator), which draws an image to be displayed by various application programs on behalf of a CPU. Furthermore, recently, accelerators including a function for executing a part of a process for decoding a compression-encoded video stream have begun to appear. Among those computers equipped with a TV function, quite a lot of them realize such TV function with software. In that case, a decoding process of a video stream needs to be executed by one module in the aforementioned software, which is operating on a CPU. A load on the CPU is expected to be greatly reduced by letting a part of the decoding process be carried out by the accelerator.

A video stream that is compression-encoded with a method compliant with the MPEG2 standard has a hierarchical structure comprising six layers: a sequence layer, a GOP (Group Of Picture) layer, a picture layer, a slice layer, a macroblock layer, and a block layer. The picture layer is a layer to be provided in pairs with respective images in the video. The slice layer located beneath the picture layer is an aggregate of partial image data (slice), which is produced by dividing each of the images in the horizontal direction. Also, the macroblock is a layer produced by dividing each of the images in a matrix form. That is to say, a slice is equal to macroblocks arranged in a row direction. A representative accelerator including a function for executing a part of the process for decoding a compression-encoded video stream is one that executes a decoding process by receiving data in slice units or macroblock units.

However, the above-mentioned accelerator, which performs a decoding process by receiving data in slice units or macroblock units, is unable to execute such a recovery process using peripheral data as is executed by an error processing apparatus disclosed in the above-mentioned Jpn. Pat. Appln. KOKAI publication No. 9-154135. Therefore, software, which tries to make the aforementioned accelerator execute the decoding process in slice units or macroblock units, is required to be provided with the following mechanism: the mechanism which supplements data for enabling the accelerator to successfully complete the decoding process and supplying the accelerator with the supplemented data, even when a part of the compression-encoded video stream is lost or an error occurs therein while being transferred.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION OF THE PREFERRED EMBODIMENT

Various embodiments according to the invention will be described hereinafter with reference to the accompanying drawings. In general, according to one embodiment of the invention, an information processing apparatus includes a recovery module which causes a decoding module to decode supplementary slice data when it is determined that the value of the information indicating a position of processing target slice data in the image is inappropriate. The recovery module creates the supplementary slice data by editing slice data located upwardly adjacent to the processing target slice in such a manner that information indicating a position thereof in the image is edited into information for the processing target slice.

First of all, a configuration of an information processing apparatus according to one embodiment of the embodiment will be described with reference to FIG. 1 and FIG. 2. The information processing apparatus of the embodiment is realized as, for example, a notebook type personal computer 10.

The computer 10 includes a television (TV) function for executing reproduction and recording of broadcast program data broadcast with a television broadcast signal. This TV function is realized with, for example, a TV application program which is preliminarily installed in the computer 10.

Figure 1:
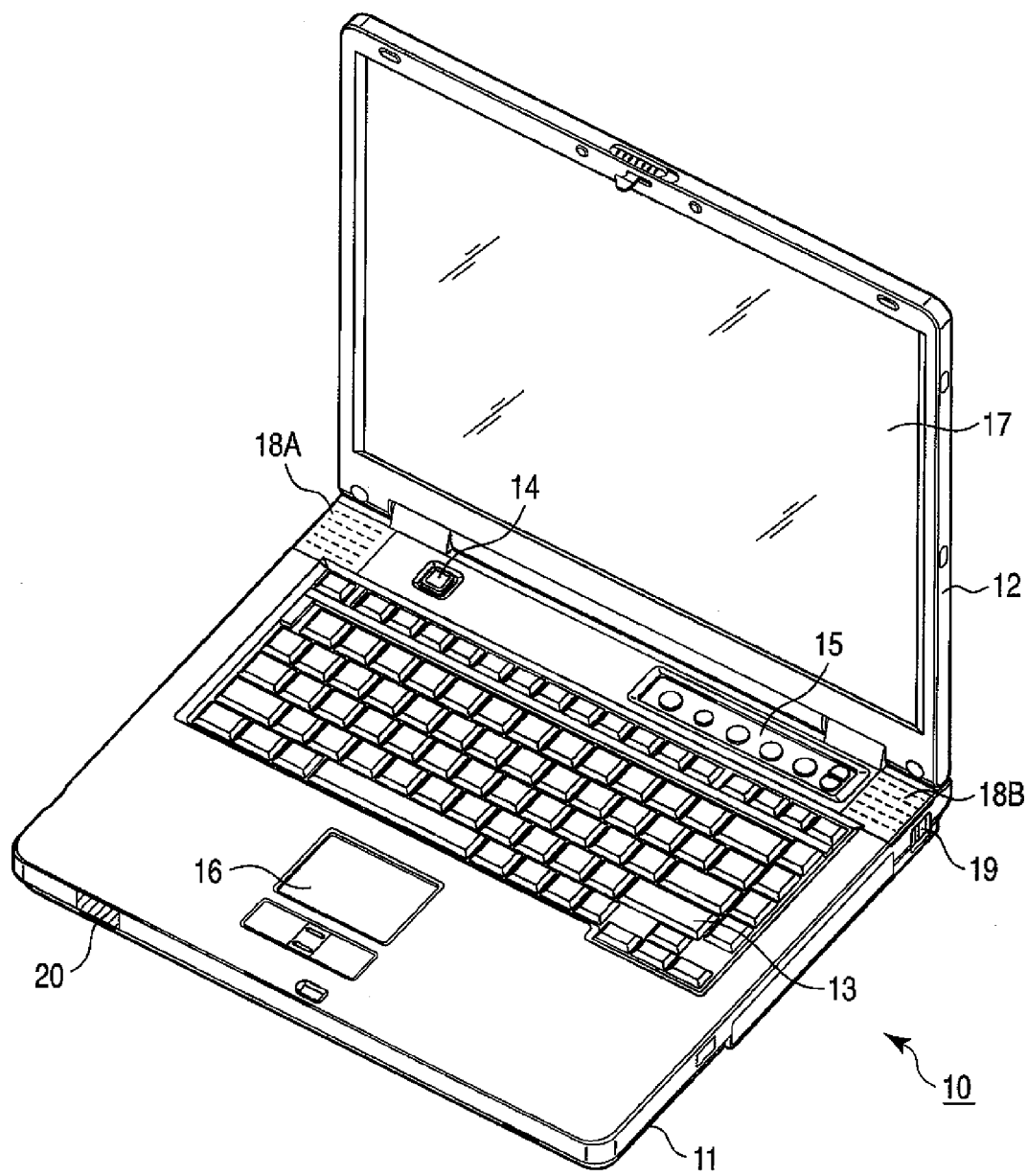
FIG. 1 is an exemplary perspective view showing an overview of an information processing apparatus according to one embodiment of the invention.

FIG. 1 is an exemplary perspective view showing the computer 10 when a display unit is opened. The computer 10 consists a computer body 11 and display unit 12. This display unit 12 incorporates a display device comprising an LCD (Liquid Crystal Display) 17.

The display unit 12 is attached to the computer body 11 in such a manner that it is rotatable between a opened position where a top surface of the computer body 11 is exposed and a closed position where the computer body 11 is covered. The computer body 11 has a thin box shaped chassis on which a keyboard 13, a power button 14 for powering on/off the computer 10, an input operation panel 15, a touch pad 16, and speakers 18A and 18B are arranged.

The input operation panel 15 is an input device for inputting events corresponding to the pressed button, and includes a plurality of buttons for activating a plurality of functions. This group of buttons includes a group of operation buttons for controlling the TV function.

Also, a remote control unit interface portion 20 for performing communications with a remote control unit, which remote controls the TV function of the computer 10, is provided on a front face of the computer body 11. The remote control unit interface portion 20 comprises an infrared signal receiver, etc. Furthermore, an antenna terminal 19 is provided on, for example, a right side surface of the computer body 11.

Next, a system configuration of the computer 10 will be explained with reference to FIG. 2.

Figure 2:
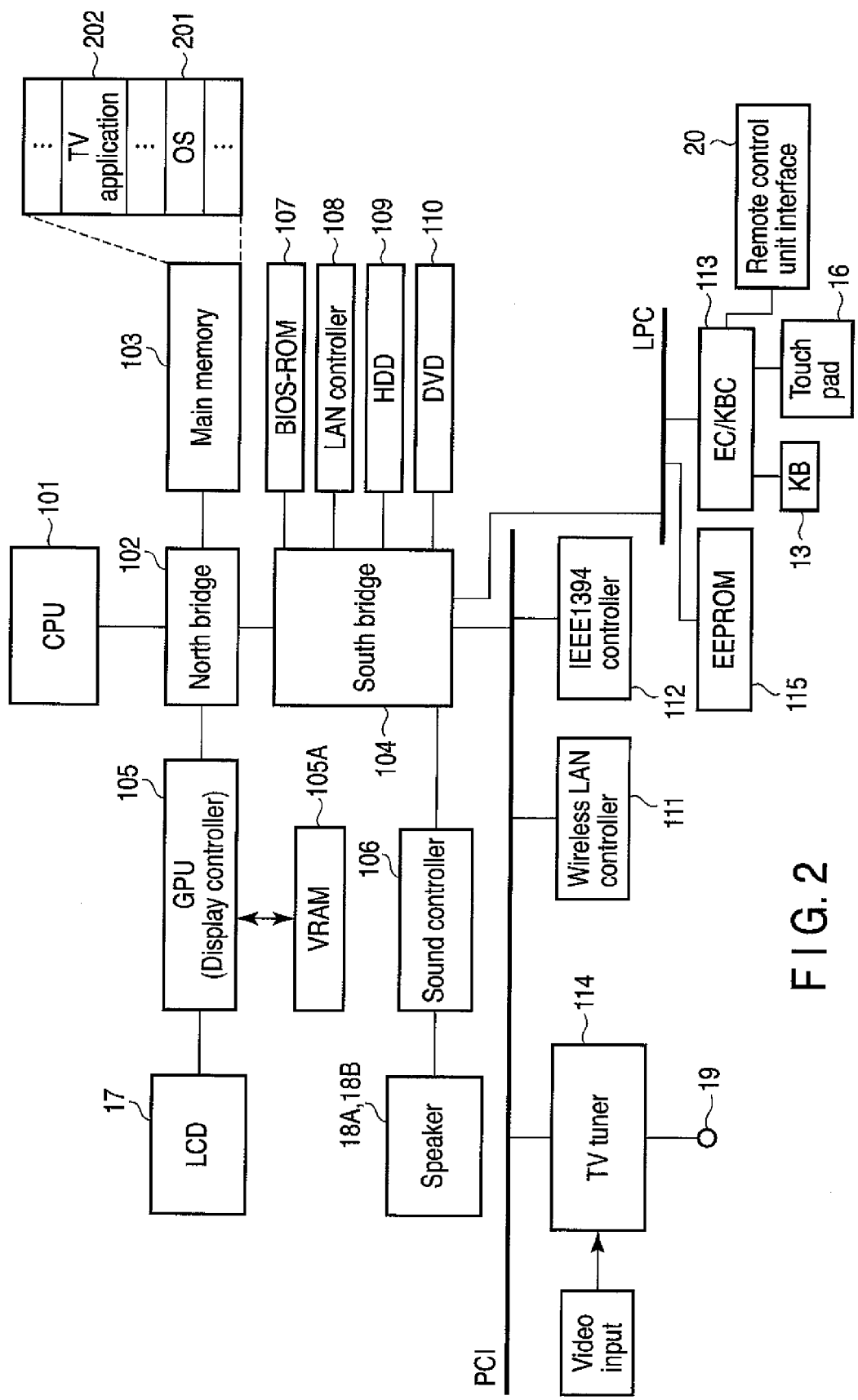
FIG. 2 is an exemplary block diagram indicating a system configuration of the information processing apparatus according to the embodiment.

The computer 10 includes, as shown in FIG. 2, a CPU 101, a north bridge 102, a main memory 103, a south bridge 104, a graphics processing unit (GPU) 105, a video memory (VRAM) 105A, a sound controller 106, a BIOS-ROM 107, a LAN controller 108, a hard disk drive (HDD) 109, a DVD drive 110, a wireless LAN controller 111, an IEEE 1394 controller 112, an embedded controller/keyboard controller IC (EC/KBC) 113, a TV tuner 114, an EEPROM 115.

The CPU 101 is a processor that controls operation of the computer 10. It executes an operating system (OS) 201 and various application programs such as a TV application program 202 operating under the OS 201, which are loaded from the HDD 109 into the main memory 103. The TV application program 202 is software for executing the TV function. This TV application program 202 executes: a live reproduction process for reproducing broadcast program data, which is received by the TV tuner 114 as an encoded video stream; a recording process for recording the received broadcast program data on the HDD 109; and a reproduction process for reproducing the broadcast program data/video data recorded on the HDD 109. Also, another possible way of utilizing the TV application program 202 is to reproduce broadcast program data obtained by way of the LAN controller 108 or the wireless LAN controller 111. Furthermore, the CPU 101 also executes a BIOS (Basic Input/Output System) stored in the BIOS-ROM 107. The BIOS is a program for hardware control.

The north bridge 102 is a bridge device for connecting a local bus of the CPU 101 and the south bridge 104. The north bridge 102 incorporates a memory controller for access controlling the main memory 103. Also, the north bridge 102 includes a function of executing communications with the GPU 105 via a serial bus of a PCI EXPRESS standard.

The GPU 105 is a display controller for controlling the LCD 17, which is used as a display monitor of the computer 10. A display signal generated by the GPU 105 is transmitted to the LCD 17. The GPU 105 includes an accelerator for drawing images to be displayed by various application programs on behalf of the CPU 101. The accelerator included in the GPU 105 includes a function to execute a part of a process of decoding an encoded video stream received by the TV tuner 114 on behalf of the TV application program 202. More specifically, the accelerator receives data included in the video stream in every predetermined unit from the TV application program 202, and executes the decoding process in the predetermined units. The computer 10 according to the invention is designed to recover data, even when a part of a video stream is lost or an error occurs therein while being transferred, in such a manner that the data in a predetermined unit to be supplied to the accelerator is effectively supplemented (in order to prevent the accelerator from abnormally completing the decoding process). This point will be described later.

The south bridge 104 controls devices on an LPC (Low Pin Count) bus and devices on a PCI (Peripheral Component Interconnect) bus. The south bridge 104 also incorporates an IDE (Integrated Drive Electronics) controller for controlling the HDD 109 and the DVD drive 110. Furthermore, the south bridge 114 includes a function of executing communications with the sound controller 106.

The sound controller 106 is a sound source device, and it outputs audio data as a reproduction target to the speakers 18A and 18B.

The wireless LAN controller 111 is a wireless communication device for executing wireless communications of, for example, the IEEE 802.11 standard. The IEEE 1394 controller 112 executes communications with an external device via a serial bus of the IEEE 1394 standard.

The EC/KBC 113 is a one-chip microcomputer on which an embedded controller for performing power management, and a keyboard controller for controlling the keyboard (KB)

13 and the touch pad 16 are integrated. The EC/KBC 113 includes a function of powering on/off the computer 10 in response to a user's operation of the power button 14. Furthermore, the EC/KBC 113 includes a function of executing communications with the remote controller interface section 20.

The TV tuner 114 is a receiver for receiving broadcast program data broadcast with a television broadcast signal, and is connected to the antenna terminal 19. The TV tuner 114 is realized as, for example, a digital TV tuner capable of receiving digital broadcast program data such as digital terrestrial broadcasting. Also, the TV tuner 114 includes a function of capturing video data input from an external device.

Figure 3:
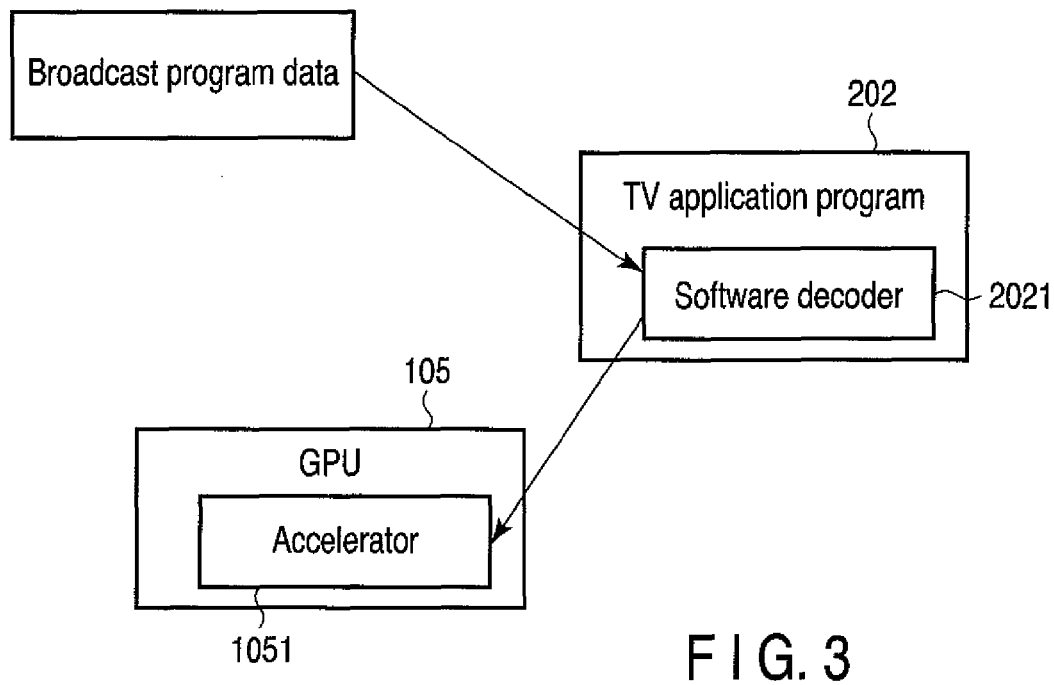
FIG. 3 is an exemplary conceptual diagram showing a relationship between a software decoder of a TV application program and an accelerator of a CPU, which are operated on the information processing apparatus according to the embodiment.

In the TV application program 202 which operates on the computer 10 having the above-described configuration and reproduces broadcast program data (video stream), a software decoder 2021, which conducts a decoding process of the broadcast program data, supplies an accelerator 1051 of the GPU 105 with data in the video stream in a predetermined units (stream units or macroblock units to be described later), as shown in FIG. 3. Now, a brief overview of a cooperation operation for a process of decoding a video stream performed by the software decoder 2021 and the accelerator 1051 will be explained with reference to FIG. 4.

Figure 4:
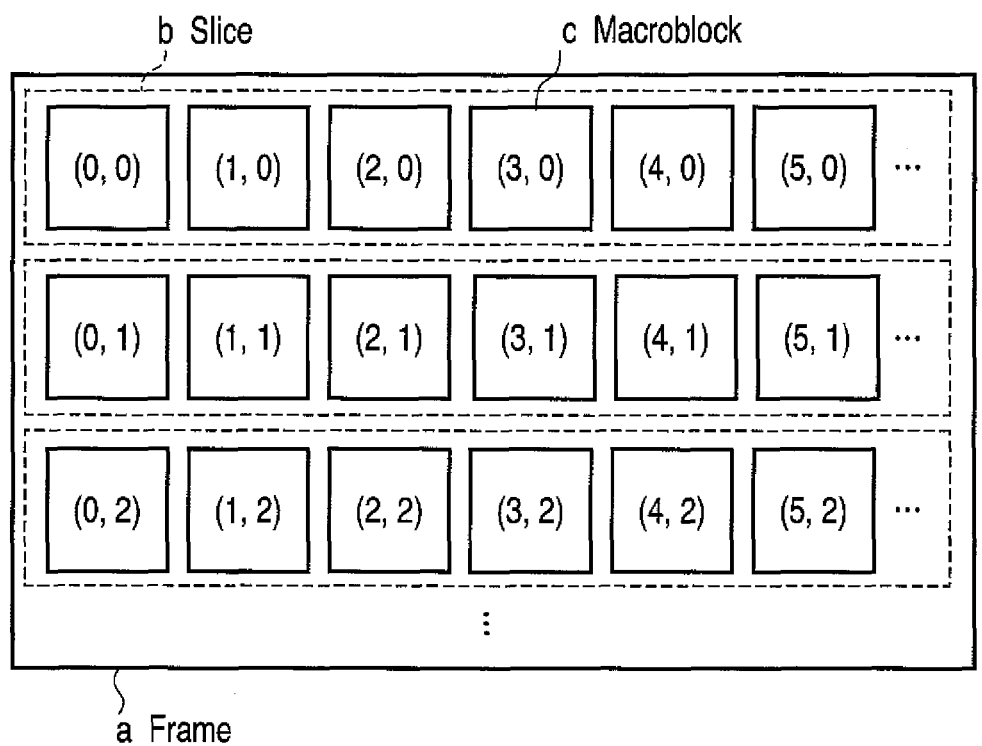
FIG. 4 is an exemplary conceptual diagram showing a relationship between a frame, slices, and macroblocks, which are contained in a video stream compression-encoded with a method compliant with the MPEG 2 standard.

According to the MPEG2 standard, which is a major method for compression-encoding videos, an image is divided into macroblocks of 16×16 pixels, and the image is encoded in these macroblock units. Then, the macroblocks are arranged in row directions to form slices. FIG. 4 is an exemplary conceptual diagram for showing a relationship between an image (frame), slices, and macroblocks.

As shown in FIG. 4, a frame "a" is divided into a plurality of slices "b", and each of the slices "b" comprises a plurality of macroblocks "c". A video stream compression-encoded with the method compliant with the MPEG2 standard has a six-layered hierarchical structure, which comprises the sequence layer, the GOP layer, the picture layer, the slice layer, the macroblock layer, and the block layer. Every frame "a" is provided with a picture layer. Also, every slice "b" is provided with a slice layer as an underlayer of the picture layer, and every macroblock "c" is provided with a macroblock layer as an underlayer of the slice layer. For instance, in a case of a video stream of 30 fps, the software decoder 2021 needs to complete a decoding process in a picture layer unit within 1/30 second.

On the other hand, the accelerator 1051 includes a function of performing a process of decoding the video stream in slice layer units or macroblock layer units. Therefore, the software decoder 2021 sequentially hands over data in a unit of the slice layer or the macroblock layer to the accelerator, for letting the accelerator carry out the decoding process.

Next, a basic principle of a recovery process, which is executed by the above-described computer 10, wherein the software decoder 2021 and the accelerator 1051 cooperate for decoding a video stream, when a part of the video stream is lost or an error occurs while being transferred, will be explained with reference to FIG. 5, FIG. 6, FIG. 7, FIG. 8 and FIG. 9.

Figure 5:
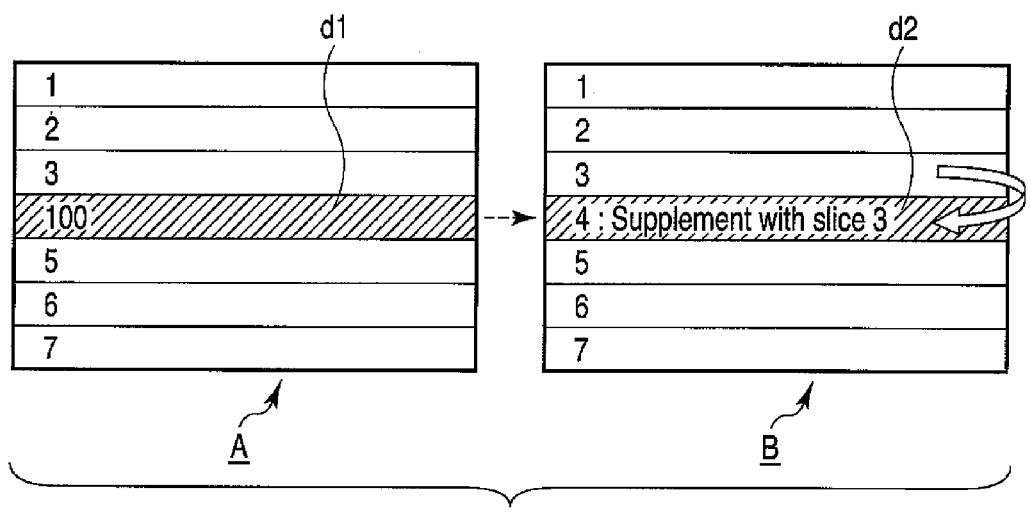
FIG. 5 is an exemplary first conceptual diagram for explaining a recovery process, which is performed in a case where a process for decoding a video stream in slice units is carried out by an accelerator, executed by the information processing apparatus according to the embodiment.
Figure 6:
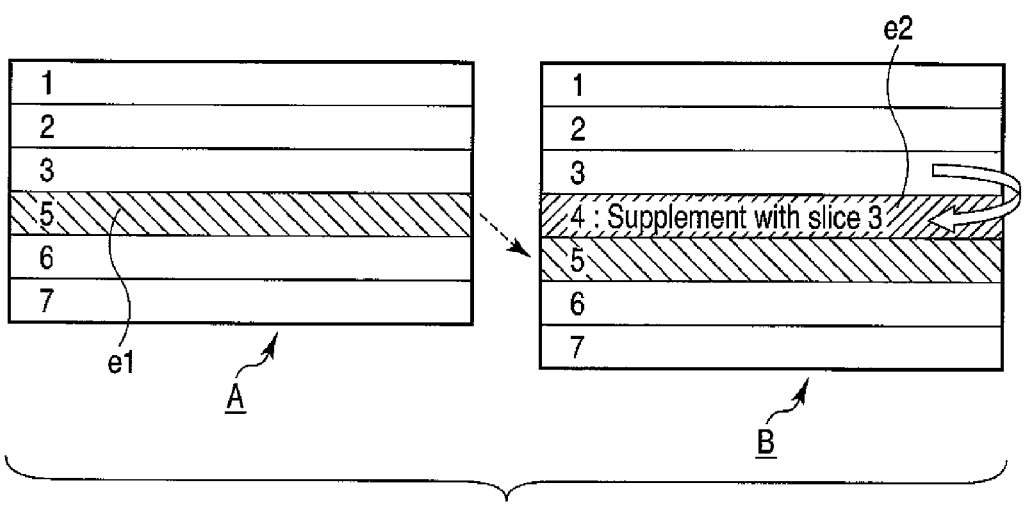
FIG. 6 is an exemplary second conceptual diagram for explaining a recovery process, which is performed in a case where a process for decoding a video stream in slice units is carried out by an accelerator, executed by the information processing apparatus according to the embodiment.

FIG. 5 and FIG. 6 are exemplary conceptual diagrams for explaining a recovery process wherein the software decoder 2021 let the accelerator carry out a process of decoding a video stream in slice units.

Figure 7A:
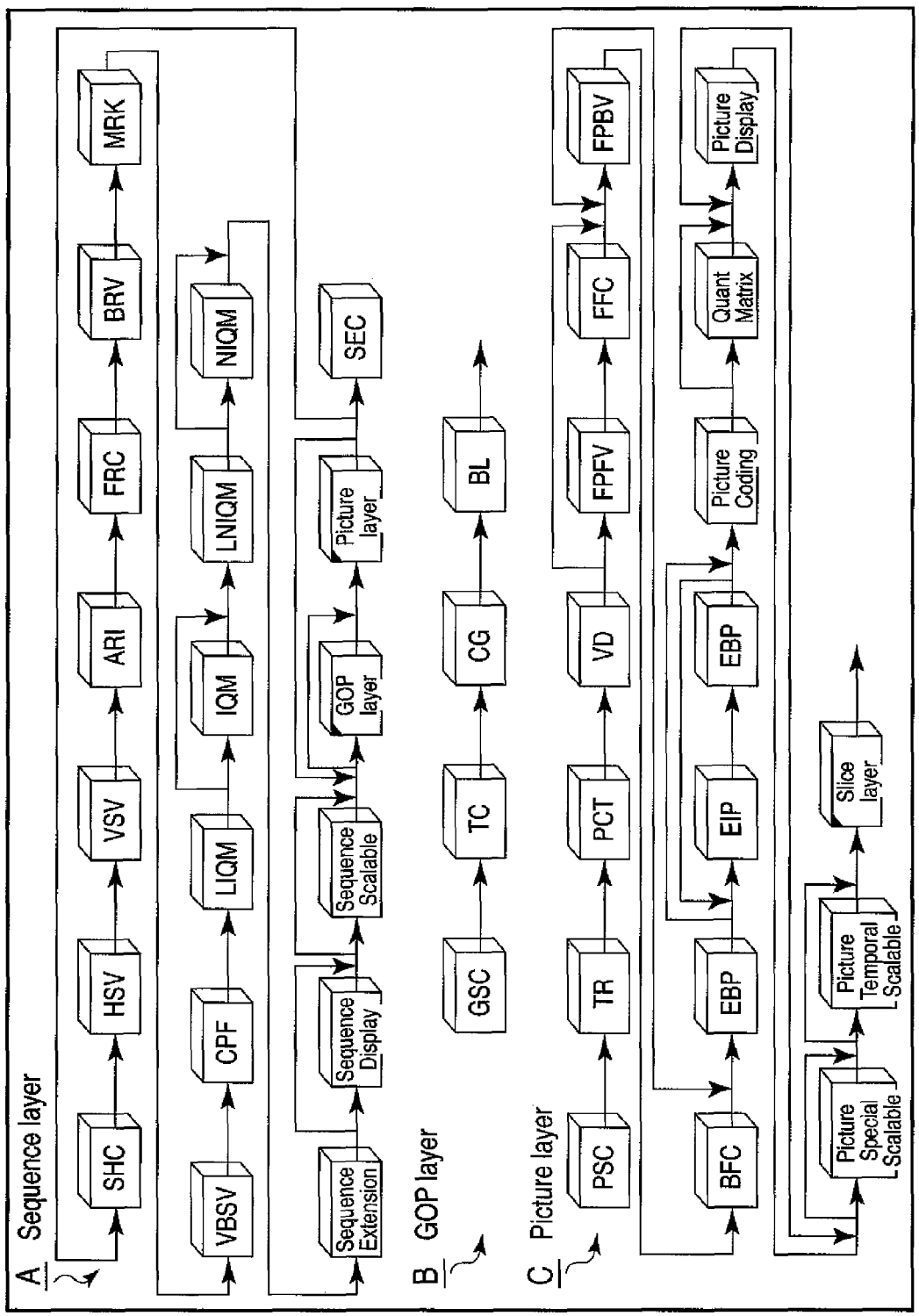
FIG. 7A and FIG. 7B are exemplary diagrams for showing a structure of a video stream compression-encoded with a method compliant with the MPEG2 standard.
Figure 7B:
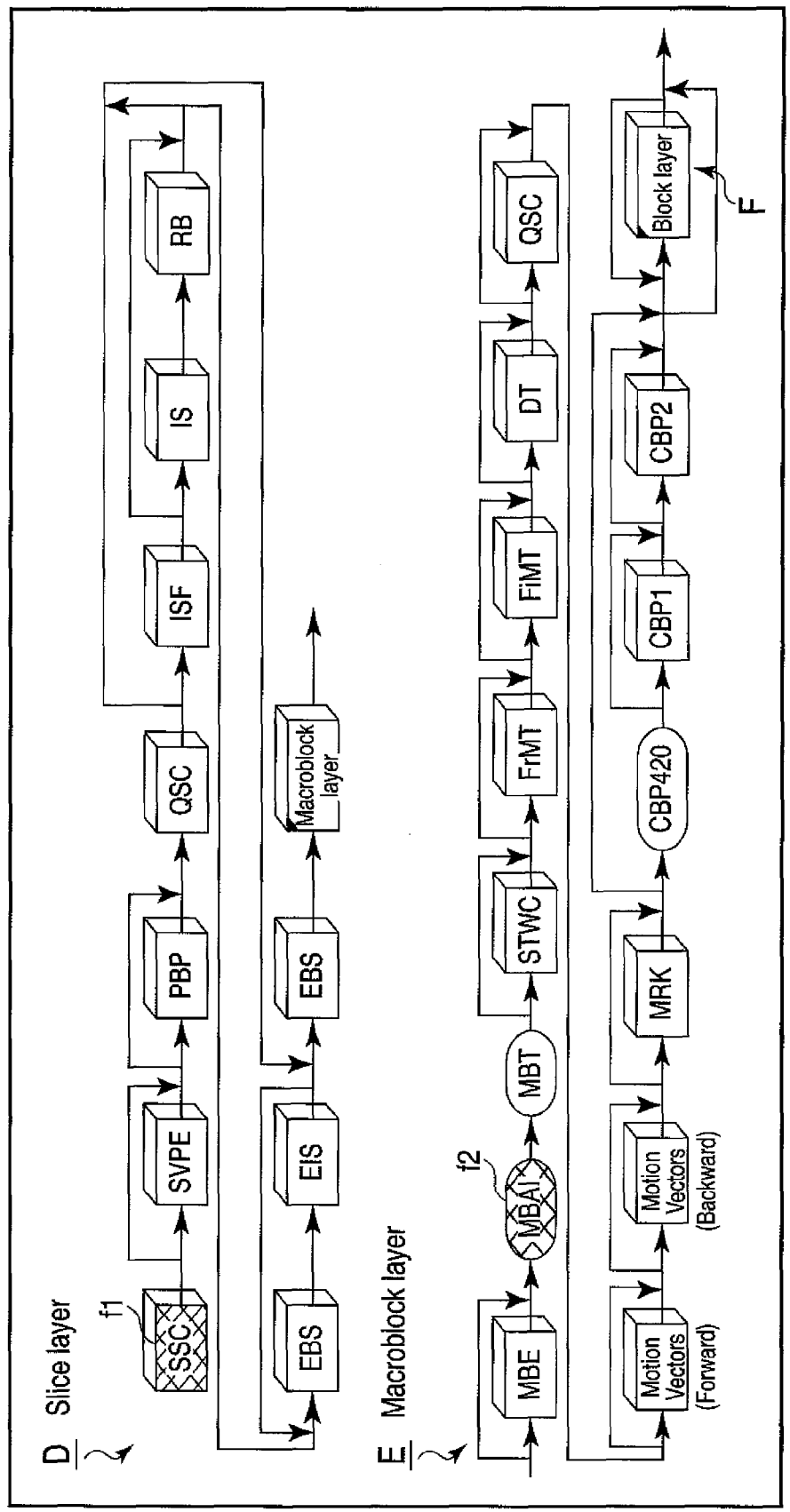

First of all, assume that an error occurs in the 4th slice ("d1") of a frame as shown in "A" of FIG. 5. According to the shown example, the value indicating a slice number for the slice is changed from "4" to "100". The software decoder 2021, which sequentially hands over data in a unit of slice layer to the accelerator 1051, checks whether or not a value indicating a vertical position of a slice in a frame is appropriate, at the time of handing over the data. FIG. 7A and FIG. 7B are exemplary diagrams for showing a structure of a video stream compression-encoded with a method compliant with the MPEG2 standard. As is described above, a video stream compression-encoded with a method compliant with the MPEG 2 standard has a six-layer hierarchical structure comprising a sequence layer ("A"), a GOP layer ("B"), a picture layer ("C"), a slice layer ("D"), a macroblock layer ("E"), and a block layer ("F"), as shown in FIG. 7A and FIG. 7B. A value for indicating a vertical position of a slice in a frame is included in a header section ("f1") of the slice layer ("D"). The software decoder 2021 is thus able to detect that the data is inappropriate as the 4th slice by referring to the value.

Furthermore, the value "100" shown in "A" of FIG. 5 is suitable for none of the subsequent slices. The software decoder 2021 therefore abandons the data, determining that an error occurred therein. Then, the software decoder 2021 edits a header section ("f1") of the 3rd slice, which is upwardly adjacent to the 4th slice and is supplied to the accelerator 1051 just before the 4th slice, into a header section for the 4th slice, as shown in "B" of FIG. 5. The data of the 4th slice is then supplemented with the edited data ("d2"), which was originally the data of the 3rd slice, and the supplemented data is supplied to the accelerator 1051.

Next, a case where the 4th slice of a frame is lost, as shown in "A" of FIG. 6, is assumed. In this case, the software decoder 2021 checks data of a 5th slice ("e1") on the presumption that it is the 4th slice. Therefore, it is detected that the checked data is inappropriate as the 4th slice, because a value for indicating a slice number for that slice is "5" instead of "4". Also, the value "5" is suitable for an immediately subsequent slice. Therefore, the software decoder 2021 determines that data of the 4th slice is lost. The software decoder 2021 supplements the lost data by using data of the upwardly adjacent slice ("e2") while keeping the data of the 5th slice, as shown in "B" of FIG. 6. Then, the software decoder 2021 supplies the kept data to the accelerator 1051.

Figure 8:
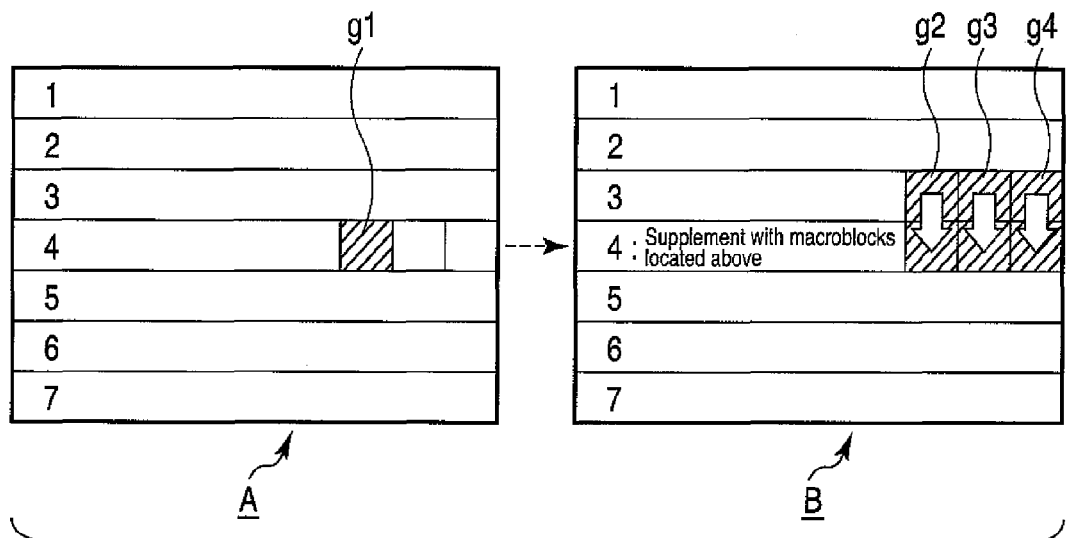
FIG. 8 is an exemplary conceptual diagram for explaining a recovery process, wherein a process for decoding a video stream in macroblock units is carried out by an accelerator, executed by the information processing apparatus according to the embodiment.

Furthermore, FIG. 8 is an exemplary conceptual diagram for explaining a recovery process wherein the software decoder 2021 makes the accelerator 1051 carry out a process for decoding a video stream in macroblock units.

The software decoder 2021, which sequentially hands over data in units of the macroblock layer to the accelerator 1051, checks, at the time of handing over, the data for the following errors: a Huffman coding table error in which variable length data (such as motion vector) deviates from a table when the variable length data is Huffman coded; and a skip macroblock error in which a skip macroblock value exceeds a standard. Here, it is assumed that an error is detected with respect to a hatched macroblock ("g1") shown in "A" of FIG. 8.

In this case, the software decoder 2021 abandons the macroblock ("g1") and all of the immediately subsequent macroblocks in the same slice. Then, the software decoder 2021 performs a supplement with respect to the abandoned macroblocks by using data of the upwardly adjacent macroblocks ("g2", "g3", "g4"), as shown in "B" of FIG. 8. At this time, the software decoder 2021 executes an edit for preventing a discrepancy in which a value of an MBAI (macroblock address increment: "f2") of the macroblock layer ("E") contradicts preceding macroblocks. This MBAI stores a value indicating a relative position from a macroblock corresponding to an immediately preceding macroblock layer (skip number), for enabling to exclude information relating to a macroblock wherein a code amount is hardly effected (e.g., hardly any change from an adjacent part).

Figure 9:
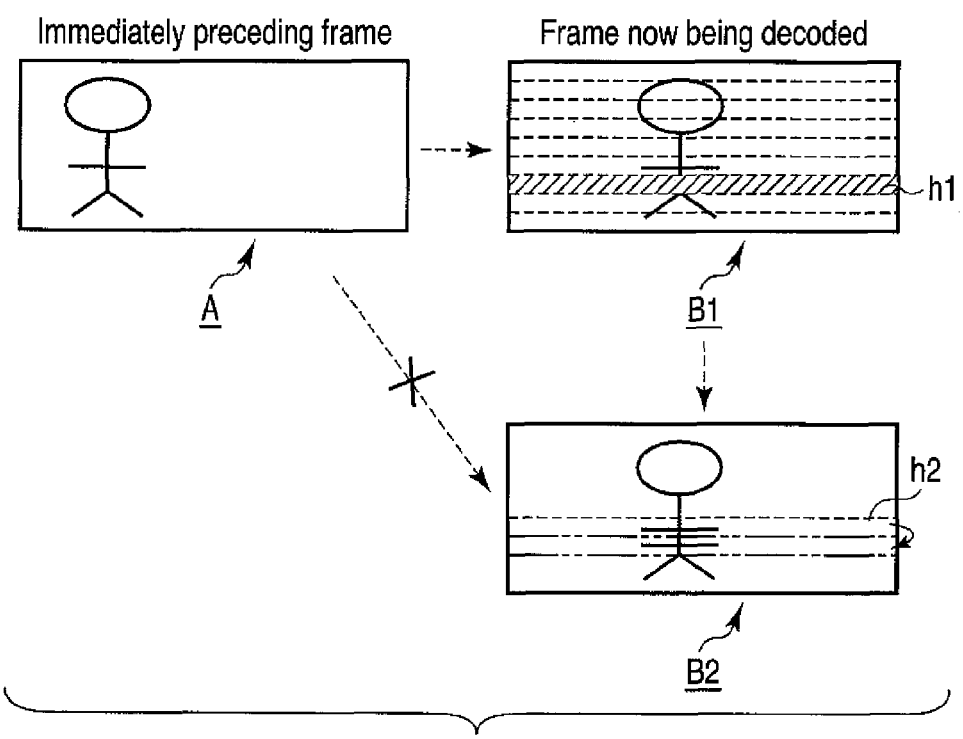
FIG. 9 is an exemplary conceptual diagram showing a basic principle of the recovery process executed during decoding of a video stream by the information processing apparatus according to the embodiment.

In other words, as shown in FIG. 9, the computer 10 performs a supplement by using data of the upwardly adjacent slice in the same frame ("h2" in "B2" of FIG. 9) without using data of the immediately preceding frame ("A" of FIG. 9), when data of a slice in a frame is lost or an error occurs therein ("h1" in "B1" of FIG. 9). That is to say, a recovery in which a high speed performance is maintained is realized, since a complex task such as searching for data of an (already decoded) immediately preceding frame which is presumably stored in a VRAM 105A is not necessary. Also, the high speed performance is maintained in the point that, in using the data of the upwardly adjacent slice in the same frame, data already decoded and stored in the VRAM 105A is not used, but the data before decoding is used for editing. Furthermore, it is possible to make the accelerator 1051, which carries out a process of decoding a video stream partially, such as in units of slices or macroblocks for the software decoder 2021, operate normally, even under the circumstance that a video stream which includes a partial defect (as mentioned above) is needed to be decoded.

Figure 10:
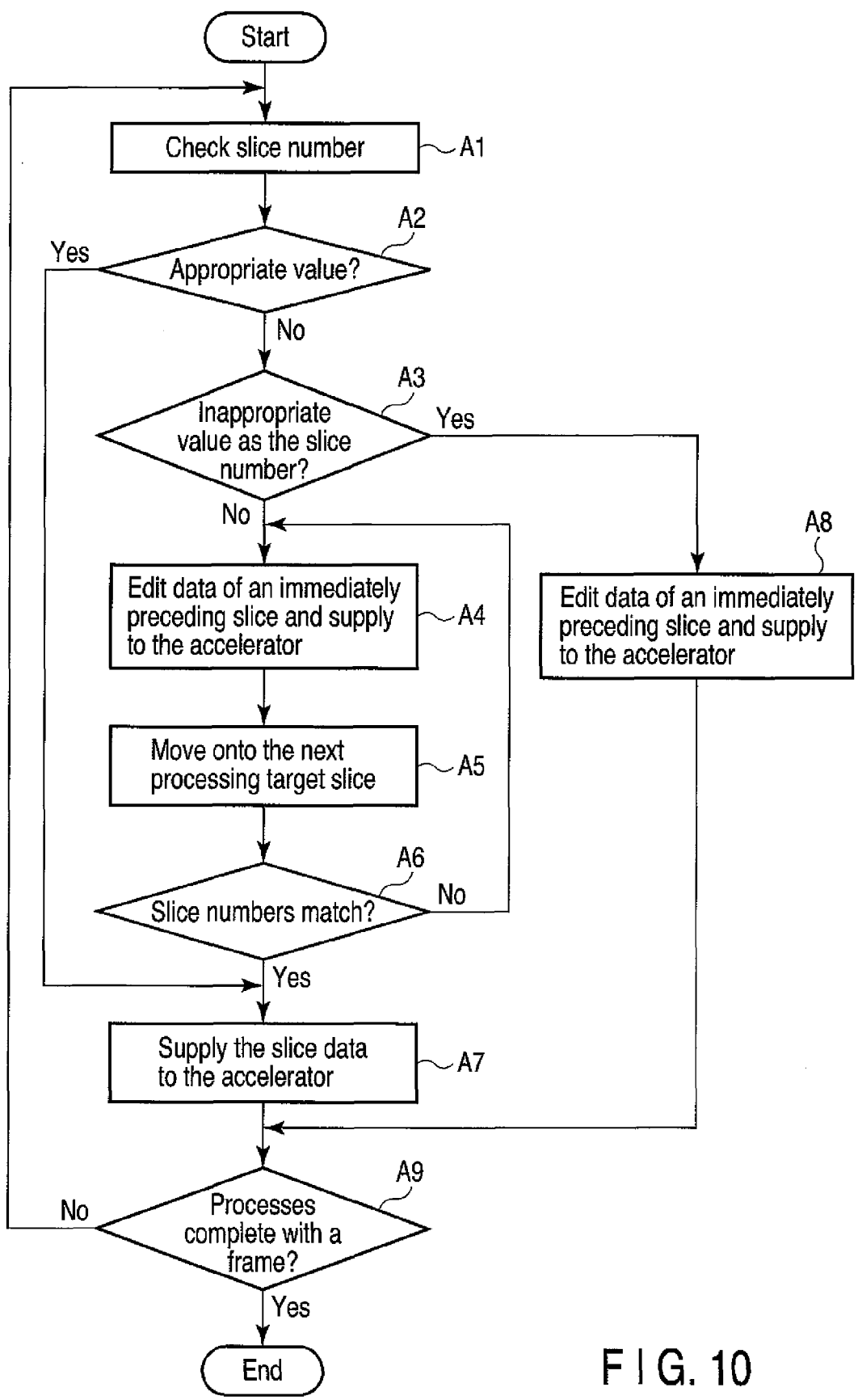
FIG. 10 is an exemplary flowchart showing operation procedures of a software decoder executed in frame units, in the case where a process for decoding a video stream in slice units is carried out by an accelerator, by the information processing apparatus according to the embodiment.

FIG. 10 is an exemplary flowchart showing operation procedures for the software decoder 2021 performed in frame units, in a case where the accelerator 1051 caries out a process of decoding a video stream in slice units for the software decoder.

The software decoder 2021 checks a value of a slice number of a slice to be handed over to the accelerator 1051 (block A1), and determines whether or not the value is appropriate (block A2). When the value is appropriate (YES of block A2), the software decoder 2021 supplies the accelerator 1051 with data of the slice (block A7).

On the other hand, when the value of the slice number is not appropriate (NO of block A2), the software decoder 2021 subsequently determines whether or not the value is suitable for any of subsequent slices (block A3). When the value the slice is suitable for none of the subsequent slices (YES of block A3), the software decoder 2021 edits data of the preceding slice which is upwardly adjacent to the slice into data for the slice, and supplies the edited data to the accelerator 1051 (block A8).

On the other hand, when the value of the slice is suitable for one of the subsequent slices (NO of block A3), the software decoder 2021 executes the following procedures: editing the data of the preceding slice upwardly adjacent to the slice into the data for the slice and supplying the edited data to the accelerator 1051 (block A4); determining whether or not the value of the slice is suitable for the next slice (blocks A5 and A6); and supplying, when the value is suitable for the next slice (YES of block A6), the data of the slice to the accelerator 1051 (block A7). When the value of the slice is not suitable for the next slice (NO of block A6), the software decoder 2021 repeats blocks from A4 onward, that is to say, repeats a supplement using the data of the immediately preceding slice.

After supplying the accelerator 1051 with the data of the slice, the software decoder 2021 determines whether or not the slice is the last slice in the frame (block A9). When it is determined that the slice is not the last slice (NO of block A9), the software decoder 2021 repeats processes from block A1 onward with respect to the next slice. On the other hand, when it is determined that the slice is the last slice (YES of block A9), the software decoder 2021 terminates processes with respect to the frame.

Figure 11:
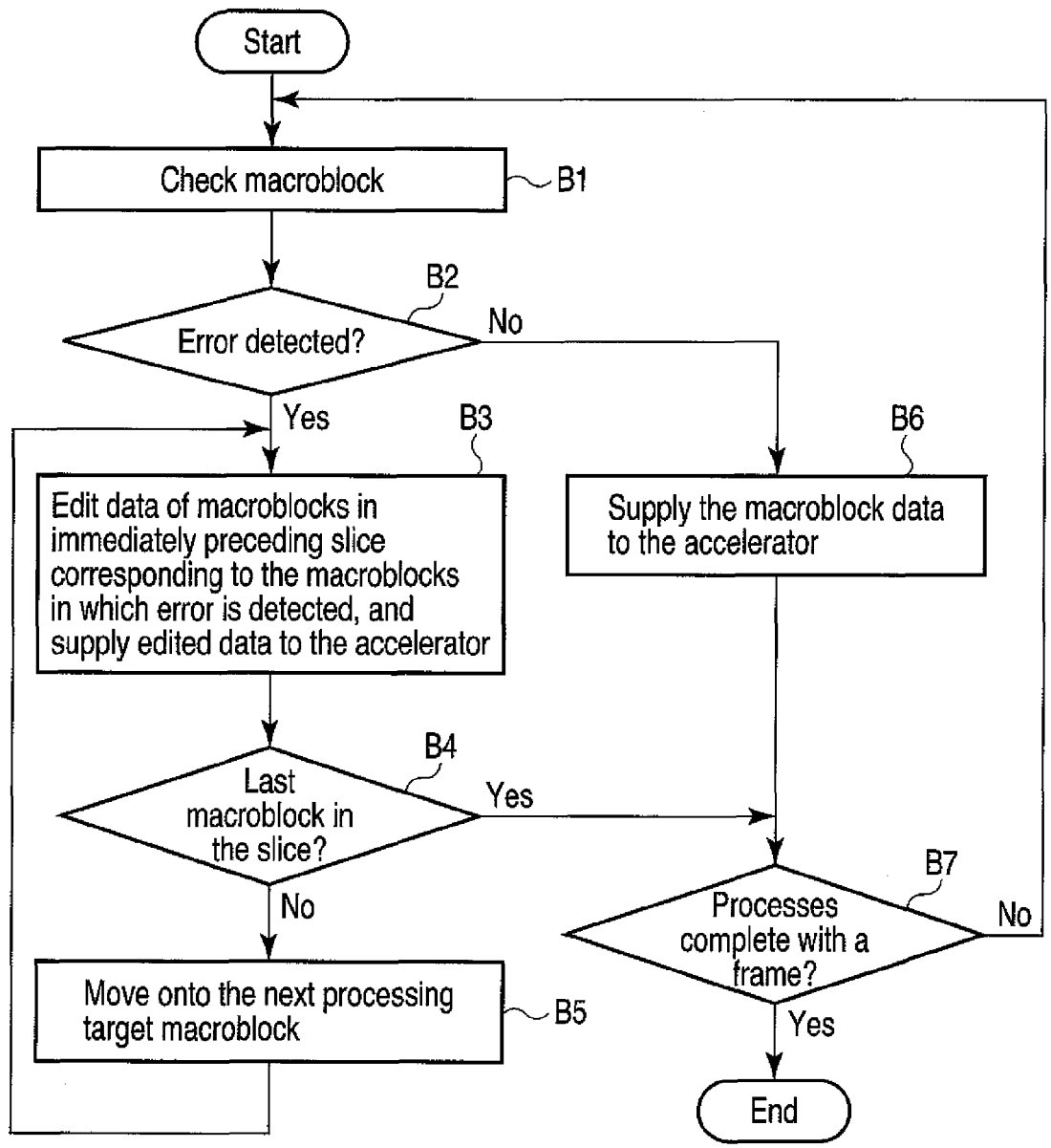
FIG. 11 is an exemplary flowchart showing operation procedures of a software decoder executed in frame units, in the case where a process for decoding a video stream in macroblock units is carried out by an accelerator, by the information processing apparatus according to the embodiment.

Furthermore, FIG. 11 is an exemplary flowchart showing operation procedures for the software decoder 2021 performed in macroblock units, in a case where the accelerator 1051 caries out a process of decoding a video stream in slice units for the software decoder.

The software decoder 2021 checks a macroblock to be handed over to the accelerator 1051 for errors such as a Huffman coding table error or a skip macroblock error (block B1). When no error is detected (NO of block B2), the software decoder 2021 supplies the accelerator 1051 with data of the macroblock.

On the other hand, when an error is detected with respect to the macroblock (YES of block B2), the software decoder 2021 edits data of a macroblock, which is in a slice upwardly adjacent to the slice including the errored macroblock and located at a position corresponding to the errored macroblock, into data for the errored macroblock, and supplies the edited data to the accelerator 1051 (block B3).

When the above supplement is performed, the software decoder 2021 determines whether or not the errored macroblock is the last macroblock in the slice (block B4). When it is determined that the errored macroblock is not the last macroblock (NO of block B4), the software decoder 2021 repeats processes from block B4 onward with respect to subsequent macroblocks (block B5). In other words, the software decoder 2021 repeats a supplementing process using data of a macroblock in an immediately preceding slice which is located in a position corresponding to an errored macroblock.

After supplying the accelerator 1051 with the data of the macroblock, the software decoder 2021 determines whether or not the macroblock is the last macroblock in the frame (block B7). When it is determined that the macroblock is not the last macroblock (NO of block B7), the software decoder 2021 repeats the processes from block B1 onward with respect to the next macroblock. When it is determined that the macroblock is the last macroblock (YES of block B7), the software decoder 2021 terminates the processes with respect to the frame.

As described above, according to the computer 10, it is possible to realize a recovery process wherein the software decoder 2021 lets the accelerator 1051 carry out a part of the process of decoding a video stream for the software decoder 2021.

In the above-described example, a supplement using data of a macroblock located upwardly adjacent to an errored macroblock is performed with respect to the errored macroblock, as a recovery process wherein the software decoder 2021 lets the accelerator 1051 carry out a process of decoding a video stream in macroblock units for the software decoder 2021. It is obviously possible to combine this method with a recovery process wherein the software decoder 2021 lets the accelerator 1051 carry out a process of decoding a video stream in slice units for the software decoder 2021.

More specifically, when a slice number for one slice is determined to be not suitable, the software decoder 2021 immediately executes a supplement using data of a slice upwardly adjacent the slice. When the slice number is determined to be suitable, the software decoder 2021 subsequently checks each of the macroblocks for errors. When an error is detected in a macroblock, the software decoder 2021 generates data of a slice wherein the error macroblock and the immediately subsequent macroblocks are replaced with data of macroblocks located upwardly adjacent to the errored macroblock and the immediately subsequent macroblocks. The software decoder 2021 then supplies the accelerator 1051 with the data of the slice in which a partial replacement is performed.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an input module configured to receive a video stream encoded in macroblocks, each macroblock of n×n pixels, the macroblocks being produced by dividing each image in a matrix form;
   an accelerator configured to decode the video stream by slice, the slice being by aligning the macroblocks in row directions; and
   a decoding controller configured to
   cause the accelerator to decode the video stream by slice by supplying the video stream received by the input module to the accelerator in slices,
   determine whether a value of position information indicating a position of each slice in the image indicates thatm each slice is in order, the position information being comprised in a header portion of each slice data in the video stream received by the input module;
   cause the accelerator to perform a decoding operation when it is determined that the value of the position information of a target slice in the image indicates that the target slice is out of order, the decoding controller creating slice data for the target slice by using slice data located upwardly adjacent to the target slice and by editing the position information to correct the order of the target slice;
   check slice data on each slice in the video stream received by the input module by each macroblock, when it is determined that the value of the position information of the target slice in the image indicates that the target slice is in order; and
   cause the accelerator to perform a decoding operation when a macroblock is error is detected, by respectively replacing the macroblock comprising the detected error as well as immediately subsequent macroblocks in the same slice with macroblocks in the same image that are upwardly adjacent to the macroblock comprising the detected error and the immediately subsequent macroblocks, and by editing the position information of the replaced macroblocks to correspond to the slice in which the macroblock comprising the detected error is located.

2. The information processing apparatus of claim 1, wherein the decoding controller is configured to discard the target slice data when the target slice that is determined to be out of order is further determined to be inappropriate for any of the slices located lower than the target slice.

3. The information processing apparatus of claim 1, wherein the decoding controller is configured to perform recovery processing using slice data upwardly adjacent to a slice that is determined to be missing when the position information of the target slice is appropriate to one of the slices located lower than the target slice in the image.

4. The information processing apparatus of claim 1, wherein the input module is configured to receive digital broadcast program data broadcast with a television broadcast signal as the video stream.

5. The information processing apparatus of claim 1, wherein the input module is configured to receive the video stream from a server connected via a computer network.

6. The information processing apparatus of claim 1, wherein the video stream is encoded with a method compliant with the Moving Picture Experts Group (MPEG) 2 standard.

7. A recovery processing method of an information processing apparatus comprising a graphics accelerator configured to decode an encoded video stream in slices, the video stream being encoded in macroblocks of n×n pixels and produced by dividing each image in a matrix form, the slices being formed by aligning the macroblocks in row directions, the method causing the information processing apparatus to perform a method comprising:
   determining whether a value of position information indicating a position of each slice in the image indicates that each slice is in order, the position information being comprised in a header portion of each slice data in a received video stream:
   causing, when it is determined that the value of the position information of a target slice in the image indicates that the target slice is out of order, the graphics accelerator to perform a decoding operation comprising creatin slice data for the target slice by using slice data located upwardly adjacent to the target slice and by editing the position information to correct the order of the target slice:
   checking slice data on each slice in the received video stream in the macroblocks, when it is determined that the value of the position information of a target slice in the image indicates that the target slice is in order; and
   causing the graphics accelerator to perform a decoding operation when an error is detected, by replacing the macroblock comprising the detected error as well as immediately subsequent macroblocks in the same slice with macroblocks in the same image that are immediately above the macroblock comprising the detected error and the immediately subsequent macroblocks, and by editing position information indicating the position in the image of the replaced macroblocks to correspond to the slice in which the macroblock comprising the detected error is located.

* * * * *